United States Patent
Kobetsky

(10) Patent No.: US 7,350,541 B2
(45) Date of Patent: Apr. 1, 2008

(54) LEAKPROOF ONE-WAY VALVE FOR USE WITH VACUUM ATTACHMENT

(75) Inventor: Robert G. Kobetsky, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 300 days.

(21) Appl. No.: 10/896,734

(22) Filed: Jul. 21, 2004

(65) Prior Publication Data
US 2005/0211319 A1    Sep. 29, 2005

Related U.S. Application Data

(60) Provisional application No. 60/555,541, filed on Mar. 23, 2004.

(51) Int. Cl.
F16K 15/14    (2006.01)
B65D 30/24    (2006.01)

(52) U.S. Cl. .............. 137/854; 137/512.15; 206/524.8; 303/61.3; 303/103

(58) Field of Classification Search ........... 137/512.15, 137/854; 206/524.8; 383/61.3, 100, 103
See application file for complete search history.

(56) References Cited

U.S. PATENT DOCUMENTS

| | | | | |
|---|---|---|---|---|
| 3,799,427 A * | 3/1974 | Goglio | ............ | 383/103 |
| 3,949,934 A | 4/1976 | Goglio | | |
| 5,368,394 A | 11/1994 | Scott et al. | | |
| 5,450,963 A * | 9/1995 | Carson | ............ | 206/524.8 |
| 5,829,884 A | 11/1998 | Yeager | | |
| 5,989,608 A | 11/1999 | Mizuno | | |
| 6,033,113 A | 3/2000 | Anderson | | |
| 6,070,728 A * | 6/2000 | Overby et al. | ............ | 206/524.8 |
| 6,089,271 A | 7/2000 | Tani | | |
| 6,408,872 B1 | 6/2002 | Skeens et al. | | |
| 6,604,634 B2 * | 8/2003 | Su | ............ | 206/524.8 |
| 6,634,384 B2 * | 10/2003 | Skeens et al. | ............ | 137/845 |
| 6,776,301 B2 * | 8/2004 | Torres-White et al. | . | 220/203.17 |
| 2002/0117215 A1 | 8/2002 | Skeens et al. | | |
| 2002/0144740 A1 | 10/2002 | Skeens et al. | | |

FOREIGN PATENT DOCUMENTS

GB    1548244    7/1979

* cited by examiner

*Primary Examiner*—Ramesh Krishnamurthy
(74) *Attorney, Agent, or Firm*—Ostrager Chong Flaherty & Broitman P.C.

(57) ABSTRACT

A one-way valve allows air to be drawn from a collapsible, flexible, airtight bag using a vacuum source. When the vacuum source is removed, the one-way valve prevents air from re-entering the bag. The valve assembly comprises a base, a valve element supported by the base, and a cap fitted onto an end of the base that is disposed in the exterior of the bag. The base comprises a flange that is disposed in the interior of the bag and is joined to a peripheral area surrounding a hole in one wall of the bag. One surface of the flange has a series of concentric heat-concentrating circular beads for speeding up the conduction heat sealing operation by which the valve assembly is attached to the bag. The valve cap is provided with a circular wall that presses the diaphragm of the valve element against a circular bead on an annular seat formed on the base for supporting the valve element.

16 Claims, 9 Drawing Sheets

LEAKPROOF ONE-WAY VALVE FOR USE WITH VACUUM ATTACHMENT

RELATED PATENT APPLICATION

This application claims the benefit, under Title 35, United States Code, § 119(e), of U.S. Provisional Application No. 60/555,541 filed on Mar. 23, 2004.

BACKGROUND OF THE INVENTION

This invention generally relates to evacuable storage containers, and in particular, to evacuable reclosable storage bags.

Collapsible, evacuable storage containers typically include a flexible, airtight bag, an opening through which an article is inserted inside the bag, and a fixture through which excess air is evacuated. A user places an article into the bag through the opening, seals the opening, and then evacuates the air in the bag through the fixture. With the bag thus evacuated, a compressible article contained therein may be significantly compressed so that it is easier to transport and requires substantially less storage space.

Collapsible, evacuable storage containers are beneficial for reasons in addition to those associated with compression of the stored article. For example, removal of the air from the storage container inhibits the growth of destructive organisms, such as moths, silverfish, and bacteria, which require oxygen to survive and propagate. Moreover, such containers, being impervious to moisture, inhibit the growth of mildew.

Not only large, compressible items such as clothing may be stored in a collapsible, evacuable storage container. For example, it may be desirable to store bulk items made of small particles, such as powders or granulated resins, in an evacuated container. One situation that commonly occurs is that a particular bulk item is shipped in a large, rigid container such as a drum. Bulk items may be moisture sensitive and are sealed against moisture during shipment. But many times a user does not need to use the entire contents of the large container, and so once exposed to the moisture in the air the remaining bulk contents quickly become unusable and are thus wasted.

One collapsible, reusable, evacuable storage container is shown in U.S. Pat. No. 5,480,030. This patent discloses a one-way air valve assembly having a flexible diaphragm that seals against a valve seat. The valve assembly also has vanes positioned to prevent the bag material or bag contents from obstructing air holes or the diaphragm while air is being evacuated through the valve assembly.

There is a continuing need for improvements in the valve assembly of such evacuable storage containers. For example, improvements that would increase the speed, and thereby reduce the cost and increase the productivity, of the manufacturing process are desired. Also, improvements in the valve assembly structure that enhance the sealing function are desired in order to ensure that the storage container will be leakproof when evacuated.

BRIEF DESCRIPTION OF THE INVENTION

The invention is directed to improvements in the valve assembly of a collapsible, evacuable storage container. Such storage containers have a one-way valve assembly that allows air to be drawn from a collapsible, flexible, airtight bag using a vacuum source. When the vacuum source is removed, the one-way valve prevents air from re-entering the bag. The valve assembly comprises a base, a valve element supported by the base, and a cap fitted onto an end of the base that is disposed in the exterior of the bag. The base comprises a flange that is disposed in the interior of the bag and is joined to a peripheral area surrounding a hole in one wall of the bag. One surface of the flange has a series of concentric heat-concentrating circular beads for speeding up the conduction heat sealing operation by which the valve assembly is attached to the bag. The valve cap is provided with a circular wall that presses the diaphragm of the valve element against a circular bead on an annular seat formed on the base for supporting the valve element.

One aspect of the invention is a valve assembly comprising: a valve base comprising a generally annular seat disposed along a periphery of a hole and a flange; and a valve element coupled to the valve base for opening the hole in a first state and closing the hole in a second state, the valve element comprising a diaphragm that is deformable and configured to contact a portion of the generally annular seat along the periphery of the hole to close the hole in the valve base when the diaphragm is in full contact around an entire circumference of the periphery of the hole in a first diaphragm state and to separate at least partially from the contacted portion of the generally annular seat to allow fluid flow through the hole in the valve base in a second diaphragm state, the diaphragm transitioning from the first diaphragm state to the second diaphragm state by deformation, wherein the flange of the valve base comprises a first generally annular surface on one side thereof, and a first generally circular bead projecting from the first generally annular surface, the first generally annular surface facing in the same direction as the generally annular seat.

Another aspect of the invention is a valve assembly comprising: a valve base comprising a generally annular seat disposed along a periphery of a hole, a generally circular outer wall projecting generally perpendicularly upward from an outer periphery of the generally annular seat, and a flange extending radially outward of the generally circular outer wall; a valve element coupled to the valve base for opening the hole in a first state and closing the hole in a second state, the valve element comprising a diaphragm that is deformable and configured to contact a portion of the generally annular seat along the periphery of the hole to close the hole in the valve base when the diaphragm is in full contact around an entire circumference of the periphery of the hole in a first diaphragm state and to separate at least partially from the contacted portion of the generally annular seat to allow fluid flow through the hole in the valve base in a second diaphragm state, the diaphragm transitioning from the first diaphragm state to the second diaphragm state by deformation, and a cap force fit onto a rim of the generally circular outer wall, the cap comprising a downwardly depending generally circular first circular inner wall having a rim that presses a generally annular portion of the diaphragm against the generally annular seat when the cap is in a predetermined position relative to the generally circular outer wall of the valve base.

A further aspect of the invention is a bag comprising: a receptacle having a mouth at an upper end and comprising a wall having an aperture; a plastic zipper joined to the mouth, wherein the zipper comprises first and second zipper strips that extend across the mouth, the first zipper strip comprising a first closure profile and the second zipper strip comprising a second closure profile, the first and second closure profiles being mutually interlockable to form a hermetic seal, the mouth being closed when the first and second closure profiles are interlocked and being open when the first and second closure profiles are disengaged; and a one-way valve assembly installed in the aperture in the wall of the receptacle and comprising: a valve base comprising a generally annular seat disposed along a periphery of a hole, a generally circular outer wall projecting generally perpendicularly upward from an outer periphery of the generally annular seat, and a flange extending radially outward of the generally circular outer wall, the flange being attached to a peripheral portion of the wall surrounding the aperture; a valve element coupled to the valve base for opening the hole in a first state and closing the hole in a second state, the valve element comprising a diaphragm that is deformable and configured to contact a portion of the generally annular seat along the periphery of the hole to close the hole in the valve base when the diaphragm is in full contact around an entire circumference of the periphery of the hole in a first diaphragm state and to separate at least partially from the contacted portion of the generally annular seat to allow fluid flow through the hole in the valve base in a second diaphragm state, the diaphragm transitioning from the first diaphragm state to the second diaphragm state by deformation, and a cap force fit onto a rim of the generally circular outer wall, the cap comprising a downwardly depending generally circular first circular inner wall having a rim that presses a generally annular portion of the diaphragm against the generally annular seat when the cap is in a predetermined position relative to the generally circular outer wall of the valve base.

Yet another aspect of the invention is a bag comprising: a receptacle having a mouth at an upper end and comprising a wall having an aperture; a hermetic seal joined to the mouth; a one-way valve assembly installed in the aperture in the wall of the receptacle and comprising: a valve base comprising a generally annular seat disposed along a periphery of a hole; a valve element coupled to the valve base for opening the hole in a first state and closing the hole in a second state, the valve element comprising a diaphragm that is deformable and configured to contact a portion of the generally annular seat along the periphery of the hole to close the hole in the valve base when the diaphragm is in full contact around an entire circumference of the periphery of the hole in a first diaphragm state and to separate at least partially from the contacted portion of the generally annular seat to allow fluid flow through the hole in the valve base in a second diaphragm state, the diaphragm transitioning from the first diaphragm state to the second diaphragm state by deformation, and a cap coupled to the valve base and comprising a downwardly depending generally circular inner wall having a rim that presses a generally annular portion of the diaphragm against the generally annular seat.

A further aspect of the invention is a method of attaching a valve base made of thermoplastic material to a film material, comprising the following steps: molding a valve base comprising a generally annular flange and a generally circular sidewall that is concentric with and generally perpendicular to the generally annular flange and disposed on one side thereof, the flange comprising a generally annular surface on one side thereof, and a first generally circular bead projecting from the generally annular surface; forming an aperture in the film material; inserting the generally circular sidewall of the valve base through the aperture in the film material until the first generally circular bead contacts an opposing portion of the film material surrounding the aperture; applying sufficient heat and pressure in a region of contact between the first generally circular bead and the film material to cause the first generally circular bead to melt; and allowing the molten material that was the first generally circular bead to fuse to the film material.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

Figure 1:
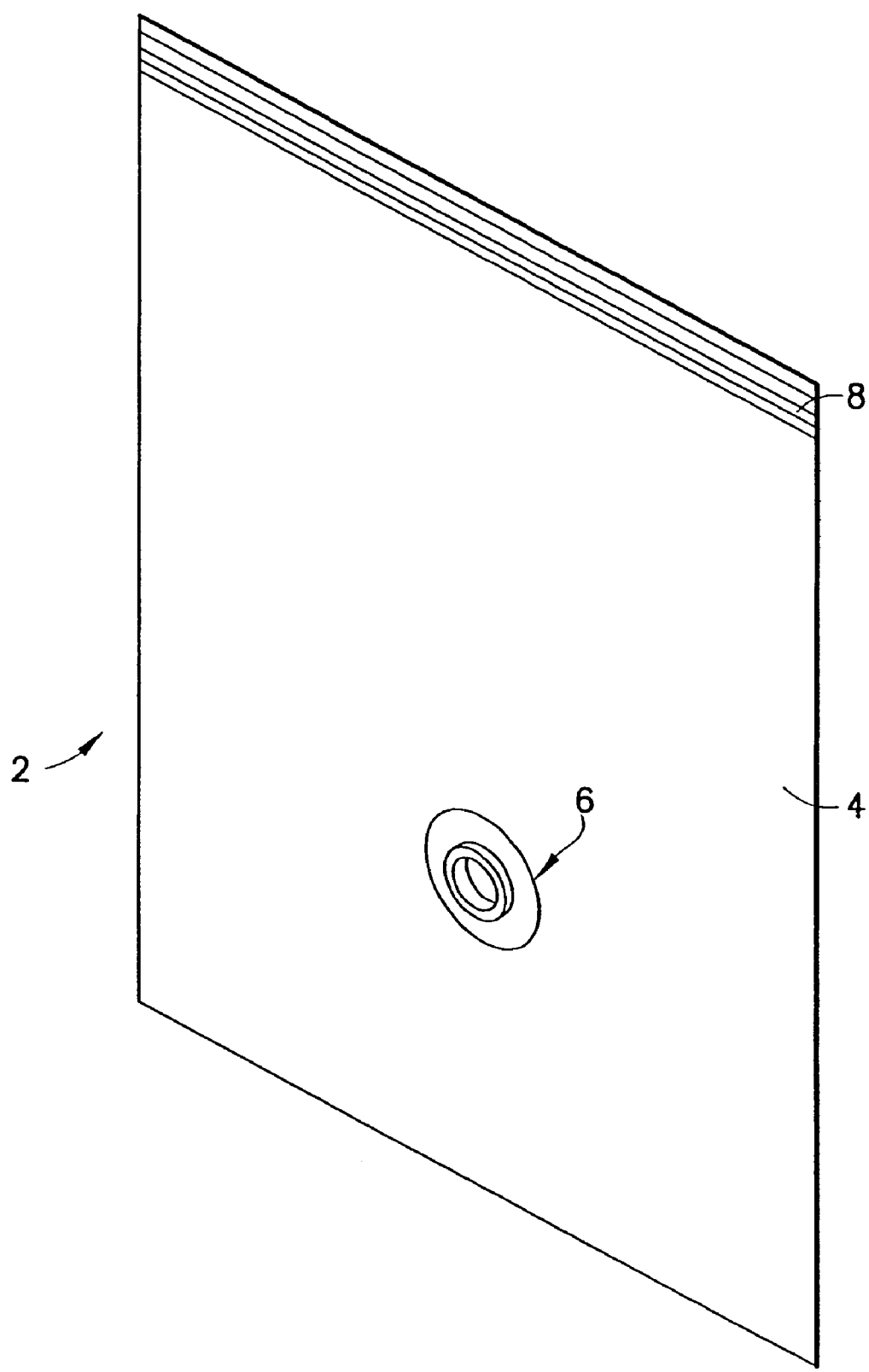
FIG. 1 is a drawing showing an isometric view of one conventional type of collapsible, evacuable storage bag.

FIG. 1 shows a conventional collapsible, evacuable storage container 2 comprising a bag 4, a valve assembly 6, and a zipper 8 comprising a pair of mutually interlockable extruded zipper strips that are joined to each other at opposing ends thereof. Although not shown in FIG. 1, the conventional valve assembly 6 also typically comprises a cap that can be snapped onto a portion of the valve assembly that is disposed on the exterior of the bag 4. The cap must be removed before the bag can be evacuated, and then is replaced after the bag has been evacuated. The cap is intended to supplement the air pressure on the diaphragm and help to seal the valve assembly to prevent air from entering the evacuated bag.

The bag 4 typically comprises front and rear walls or panels (made of thermoplastic material) that are joined together at the bottom and two sides by conduction heat sealing to form a receptacle having an interior volume and a mouth in which the zipper 8 is installed. One wall of bag 4 has a hole (not shown in FIG. 1) in which to install the valve assembly 6. The bag may be constructed of a blended extrusion layer of polyethylene sandwiched between a nylon layer and a layer of polyethylene sheeting. However, the materials comprising the bag may be altered so as to prevent interaction with the bag contents.

During use, one or more discrete articles or a bulk material (not shown) may be placed inside the bag 4 while the zipper 8 is open, i.e., while the closure profiles of the interlockable zipper strips are disengaged from each other. After the article or material to be stored has been placed inside the bag, the mouth of the bag 4 can be sealed by pressing the zipper strips together to cause their respective closure profiles to interlock with each other. Although the zipper closure profiles may have many different designs, the design must be one that ensures that an airtight seal can be formed at the mouth of the bag.

With the zipper 8 closed, the interior volume of the bag or receptacle 4 is hermetically sealed. The interior volume can now be evacuated by sucking air out of the bag via the one-way valve assembly 6. Air can be drawn out of bag 4 through valve assembly 6 using a conventional vacuum source, such as a household or industrial vacuum cleaner. The valve assembly 6 and the zipper 8 maintain the vacuum inside bag 4 after the vacuum source is removed.

One conventional type of valve assembly will be described hereinafter with reference to FIG. 2; then one conventional type of zipper will be described with reference to FIG. 13. Thereafter, a valve assembly in accordance with one embodiment of the present invention will be described with reference to FIGS. 4-12.

Figure 2:
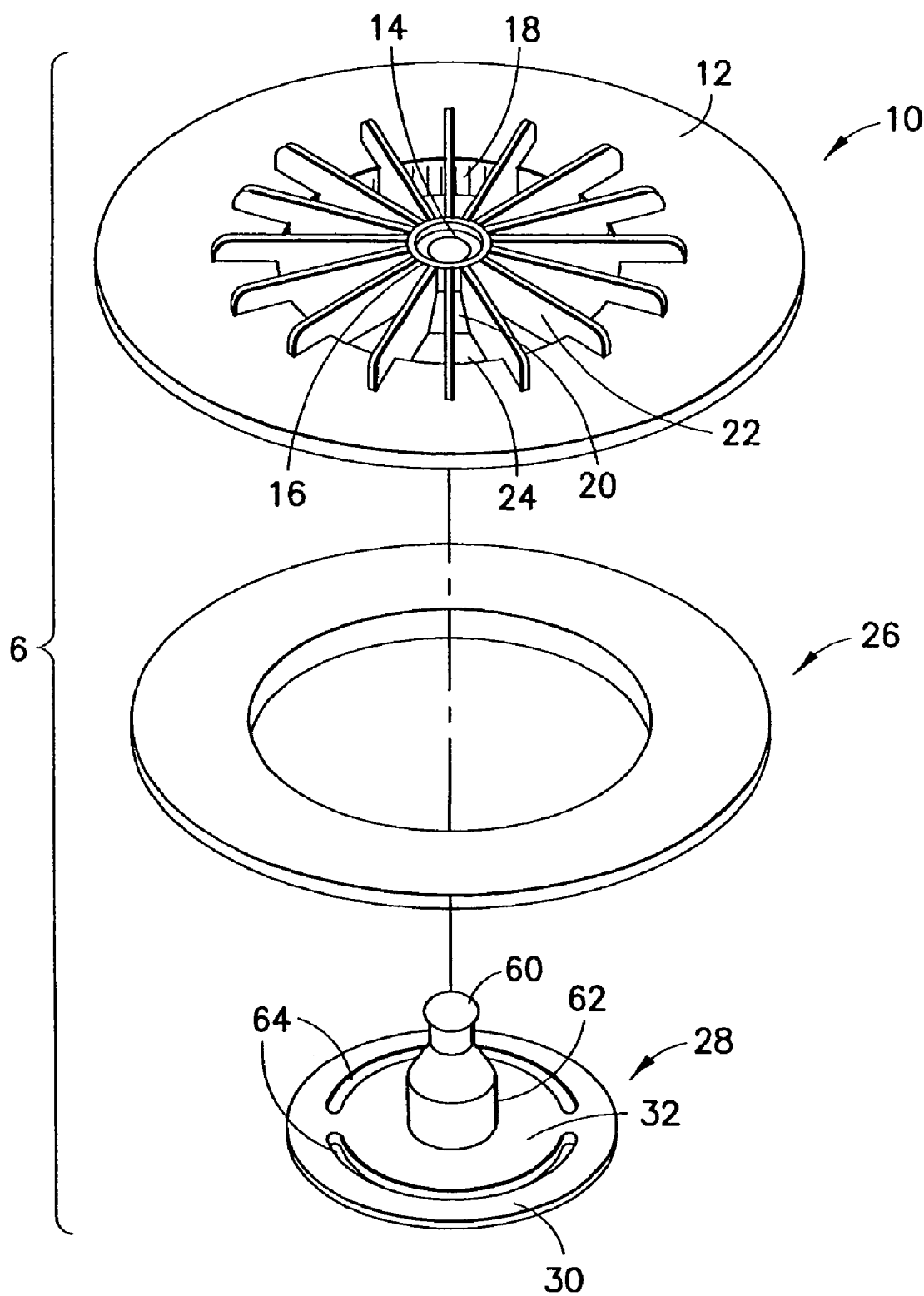
FIG. 2 is a drawing showing an exploded isometric view of a known valve assembly suitable for use with a bag of the type depicted in FIG. 1.

FIG. 2 is an exploded isometric view showing a conventional valve assembly 6. The valve assembly 6 comprises a base 10, a retaining ring 26, and a valve element 28. The valve assembly 6 is mounted to the bag 4 (see FIG. 1) such that a flange 12 of base 10 is on the inside of the bag. Base 10 extends through the hole in the bag and is held in place by welding the base flange 12 to the bag material to provide the seal. The retaining ring 26 is placed over the base 10 on the outside of the bag to cover the weld area.

The valve element 28 provides the one-way airflow feature in valve assembly 6. In a known embodiment, the valve element 28 is made of clear polyvinylchloride (PVC). Valve element 28 has an outer annular portion 30 and an inner diaphragm 32. The annulus 30 and diaphragm 32 are connected by respective neck or bridge portions, but are otherwise separated by a pair of arc-shaped slots or gaps 64. The annular portion 30 functions as a face against which a vacuum source, such as a conventional household or industrial vacuum cleaner nozzle (not shown), may be sealed as the nozzle is pressed against the base 10. When the nozzle is in place and a vacuum device or source draws air through the nozzle, the diaphragm 32 flexes open and air inside the bag passes through a plurality of holes 20 in base 10 and into the vacuum nozzle. When the nozzle is removed, the diaphragm 32 returns to its original shape and seals against the base 10, thus preventing air from passing back into the bag through holes 20 in the base. The seal is further enhanced by the positive air pressure on the external surface 32.

Figure 3:
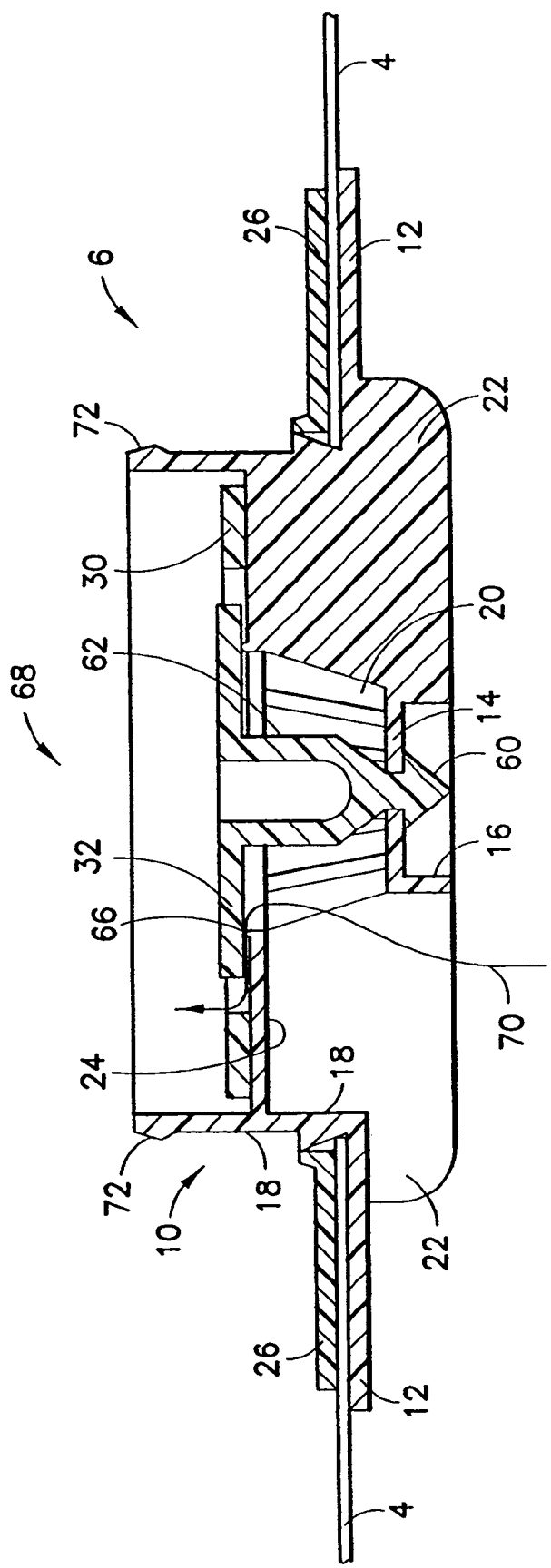
FIG. 3 is a drawing showing a cross-sectional view of a known valve assembly attached to a bag of the type depicted in FIG. 1 (the cap of the valve assembly is removed).
Figure 4:
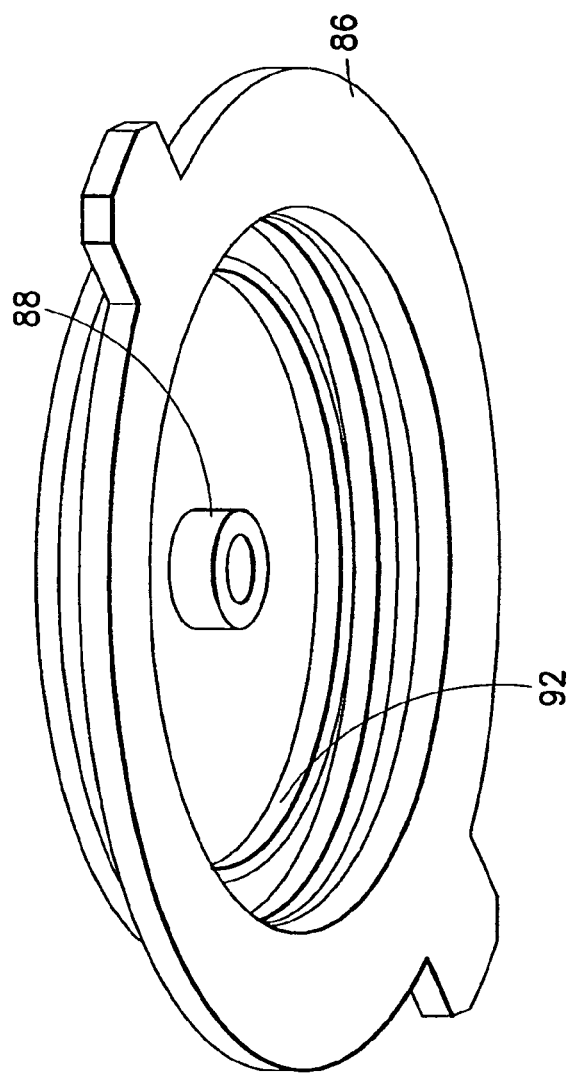
FIG. 4 is a drawing showing an isometric view of a known cap for a valve assembly.

As shown in FIG. 2, a plurality of radial vanes 22 separate holes 20. Vanes 22 radiate outward from a circular inner sidewall 16 that supports an annular seat 14. The annular valve element seat 14 surrounds an opening through which the head 60 at the end of the stem 62 of the valve element 28 is passed, as best seen in FIG. 3. FIG. 3 is a cross-sectional view of the assembled valve assembly 6, the section plane being parallel to and intersecting the central axis A depicted in FIG. 2. The annular seat 14 is a ring having an outer diameter greater than the outer diameter of the head 60 and having an inner diameter less than the outer diameter of the head 60. The valve element 28 is made of an elastic material, so that the head 60 compresses as it passes through the opening in the annular seat 14 and then expands on the other side, in which state the undersurface of the head rests on and is supported by the seat 14.

Still referring to FIG. 3, the base 10 further comprises a circular outer sidewall 18 that supports another annular valve element seat 24. The annular seat 24 is a ring having an outer diameter greater than the outer diameter of the outer annular portion 30 of the valve element 28 and having an inner diameter greater than the maximum diameter of the stem 62. The outer annular portion 30 of the valve element 28 sits on the seat 24, while the diaphragm 32 sits on a circular bead 66 that projects above the plane of the surface of seat 24 at the edge of a circular opening 68 provided in the base 10. Bead 66 has a generally constant profile along its circumference.

In FIG. 3, the valve base 10 is shown inserted through a flexible, airtight bag 4 and held in place by an annular retaining ring 26. A vacuum source (not shown) can be placed with the terminus of its nozzle pressed against the outer annular portion 30 to draw air through the valve. The suction applied by the vacuum nozzle causes the diaphragm 32 to flex. The opening 68 is in fluid communication with the multiplicity of holes 20 when any portion of the diaphragm 30 is lifted off of the bead 66. The flow of air out of the bag during suction is indicated by the arrow 70 in FIG. 3. During lifting of the diaphragm 32, the head 60 is latched behind the seat 14, thereby preventing the valve element from popping out of the base 10. When the vacuum source nozzle is removed, diaphragm 32 returns to its position sealed against bead 66 so as to prevent air from flowing in a reverse direction through the valve.

It is known to place a removable cap 86 (shown in FIG. 4) over the opening 68 (shown in FIG. 3) to protect inner portions of the valve assembly 6. After the vacuum source has been removed, the cap can be snapped onto the end of the sidewall 18, which has an outer peripheral bead 72. Bead 72 has a generally constant profile along its circumference. The cap has a sidewall with an inner peripheral bead that is pushed past the bead 72. The cap will be held on by frictional forces as well as by the resistance presented by the bead 72 to removal of the cap. It is known to provide a central post 88 inside the cap 86 (see FIG. 4) that presses the central portion of the diaphragm (at the base of the stem 62 shown in FIG. 3) downward when the cap is pushed onto the base sidewall 18. This design is intended to exert a pressure that maintains the diaphragm 32 in contact with the bead 66 on the seat 24. The known cap also has a circular downwardly depending wall 92 that stops the cap as it is pressed onto the base.

Figure 5:
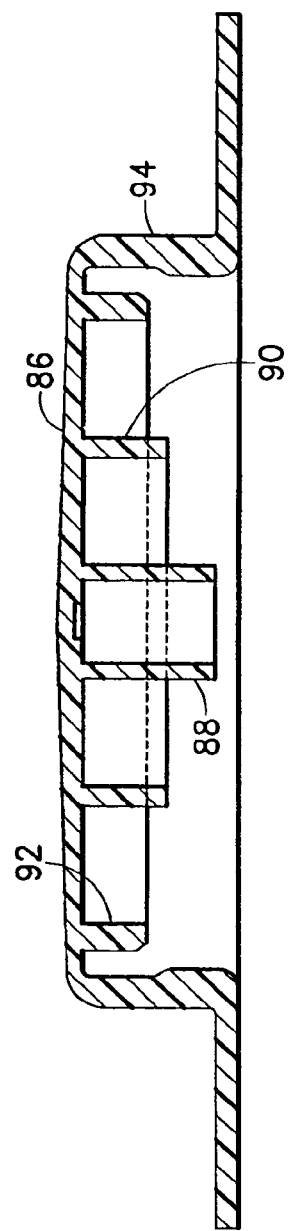
FIG. 5 is a drawing showing a cross-sectional view of a cap in accordance with one embodiment of the present invention.
Figure 6:
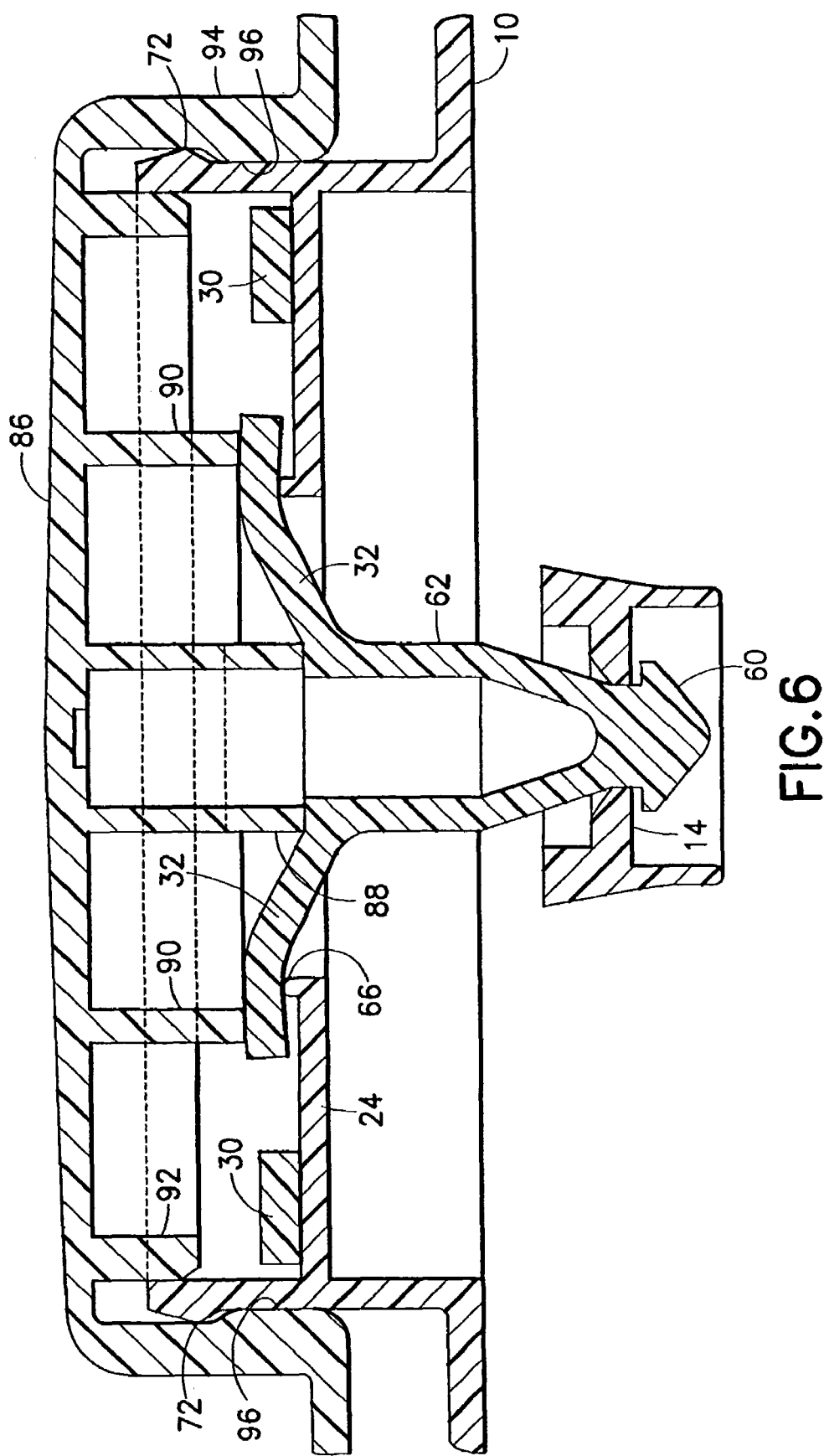
FIG. 6 is a drawing showing a cross-sectional view of the cap of FIG. 5 seated on a valve assembly similar to the type shown in FIG. 3.

In accordance with one embodiment of the present invention, the removable cap 86 is provided with means for pressing the radially outermost portion of the diaphragm 32 against the bead 66 of the seat 14 (see FIG. 3). Referring now to FIG. 5, these means comprise a circular downwardly depending wall 90 that is generally concentric with the center post 88 and with the sidewall 94 of the cap. The wall 90 has a height sufficiently great that the bottom edge of the wall presses the confronting annular portion of the diaphragm 32 against the bead 66, as shown in FIG. 6. Preferably the wall 90 has a diameter slightly greater than the diameter of bead 66, but less than the outer diameter of the diaphragm 32. The bead 66 is shown on a magnified scale in FIG. 12, which is a blow-up of the region encompassed by the dash-dot circle in FIG. 11.

Figure 7:
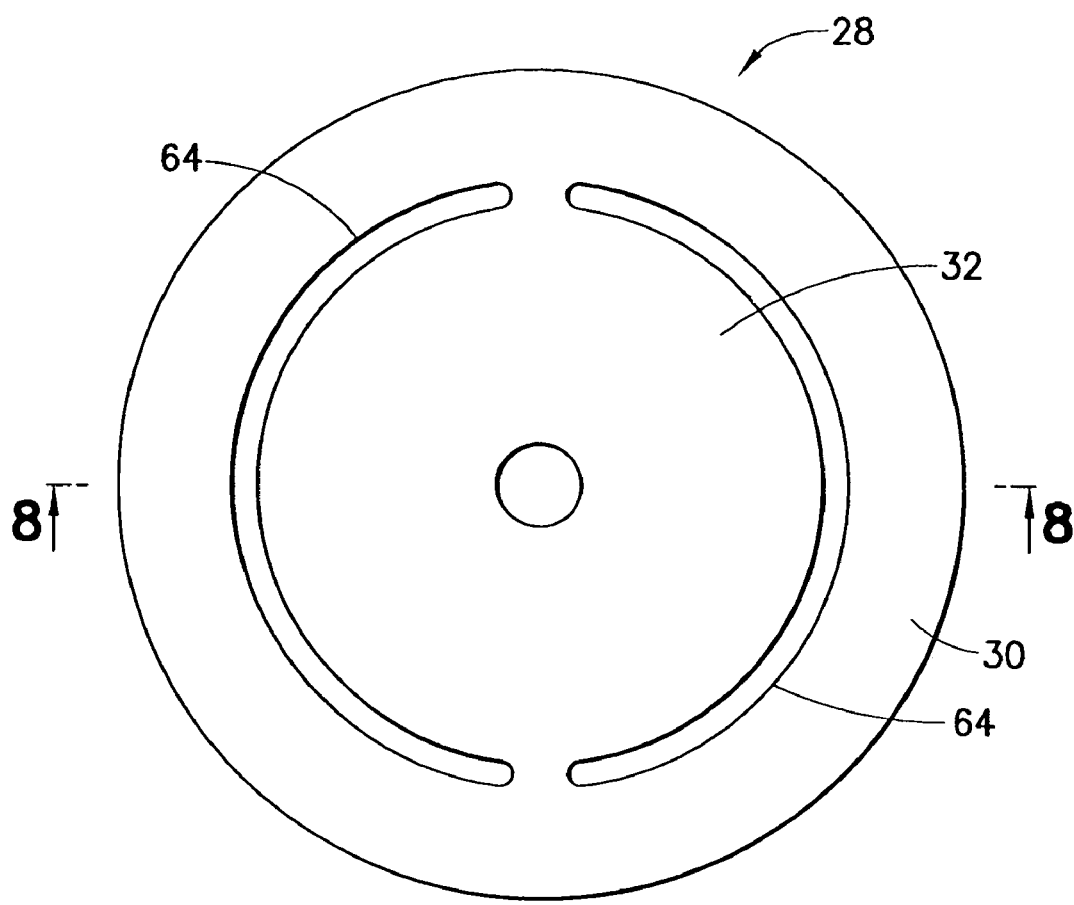
FIG. 7 is a drawing showing a top view of a valve element in accordance with the disclosed embodiment of the invention.
Figure 8:
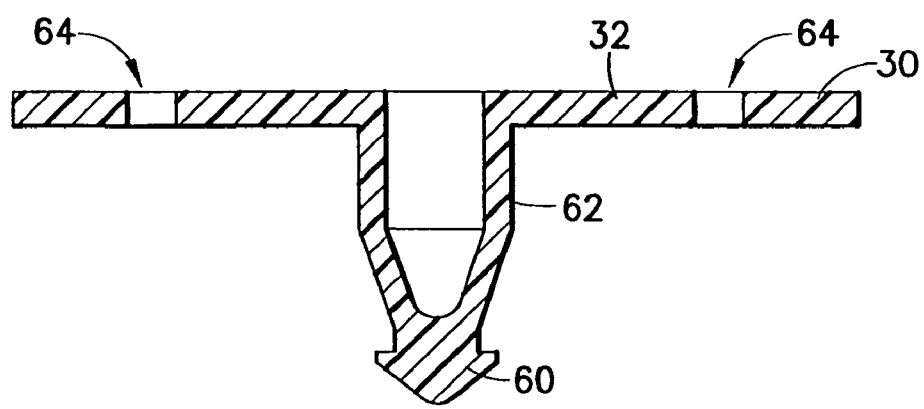
FIG. 8 is a drawing showing a cross-sectional view of the valve element of FIG. 7, the section being taken along line 8-8 seen in FIG. 7.
Figure 9:
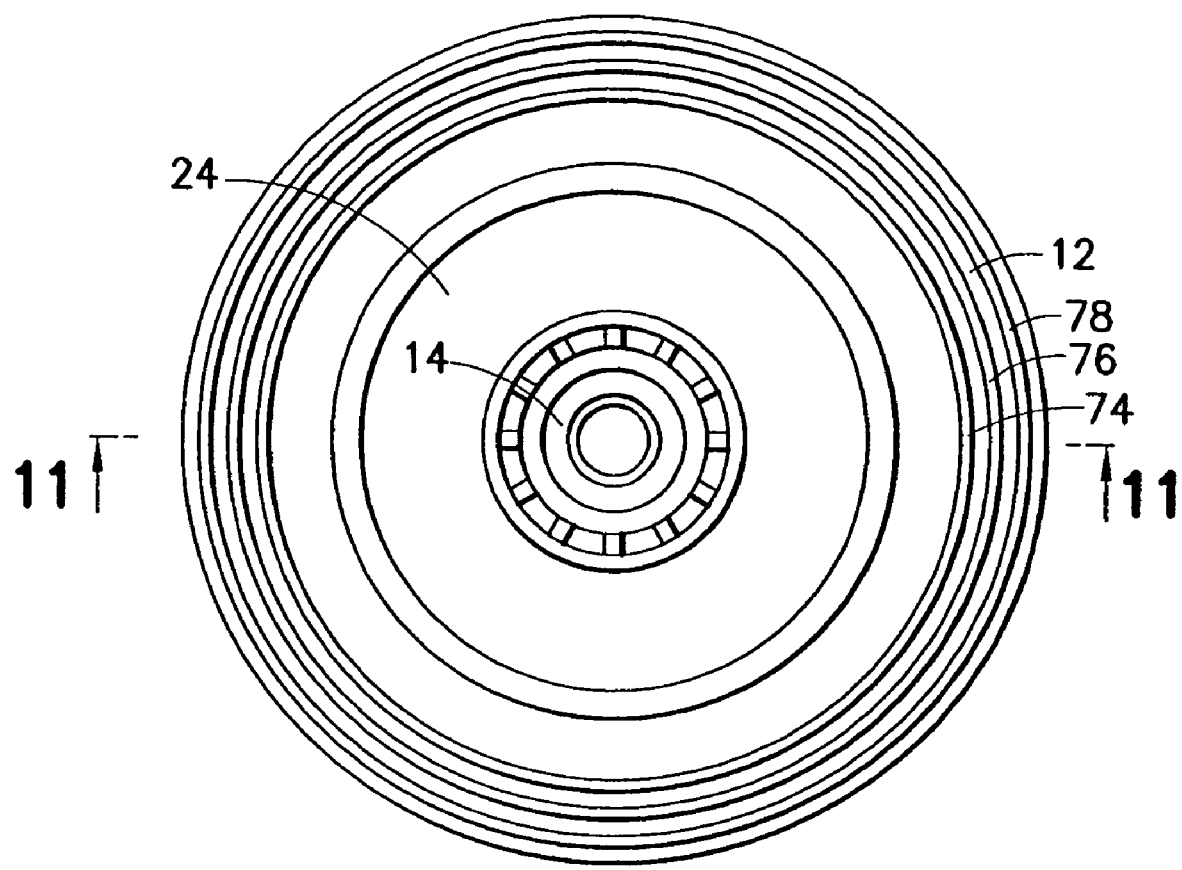
FIGS. 9 and 10 are drawings showing top and side views respectively of a valve assembly base in accordance with the disclosed embodiment of the invention.

The additional circular ring 90 in the cap 86 effectively improves the vacuum sealing ability of the valve assembly. However, due to a variety of practical reasons—e.g., softer valve element material, thinner valve element stem, increased vacuum drawn, greater diameter tolerances between the stem of the valve element and the bore in the base, and others—it was found that the valve element could, infrequently, move lower into the base. This movement reduces the effective diameter of the valve element diaphragm under vacuum to such an extent that the circular ring 90 in the cap no longer properly contacts the valve element diaphragm 32. This problem was solved by increasing the valve element diaphragm diameter sufficiently to afford the ring 90 in the cap 86 a much larger-diameter diaphragm 32 to engage. Such a valve element 28 is shown in FIGS. 7 and 8. In one exemplary construction, the circular ring 90 had an inner diameter of 19.00 mm and an outer diameter of 22.00 mm, while the diaphragm had an outer diameter of 26.416 mm and the arc-shaped slots had a width of 1 mm.

As seen in FIG. 5, the cap 86 further comprises a second circular downwardly depending wall 92 that is generally concentric with the wall 90. The height of wall 92 is less than the height of wall 90, but has a greater diameter generally equal to the outer diameter of the annular outer portion 30 of the valve element 28. The rim of the sidewall 18 of the base 10 fits in an annular space between the circular wall 92 and the sidewall 94 of the cap 90. A bead 96 projecting radially inward from the sidewall 94 is pushed past the outer peripheral bead 72 formed on the rim of the base sidewall 18 during installation of the cap 86. The interference of these beads provides a resistance to removal of the cap 86. Bead 96 has a generally constant profile along its circumference.

Figure 10:
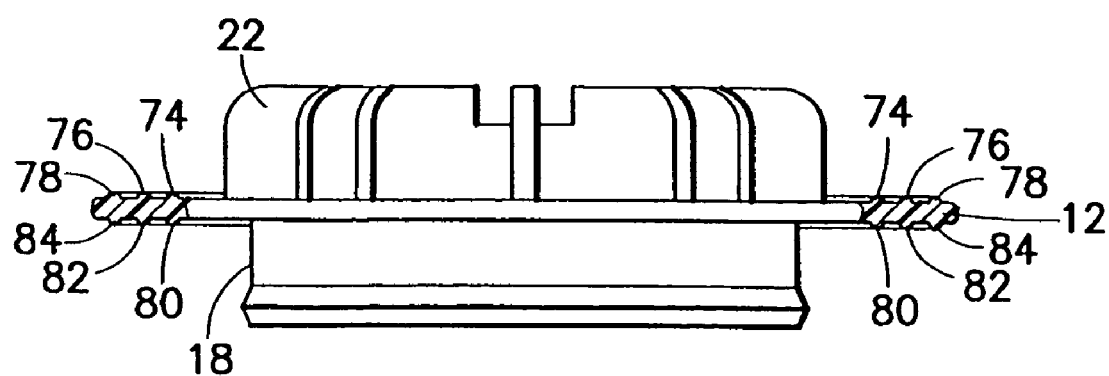
Figure 11:
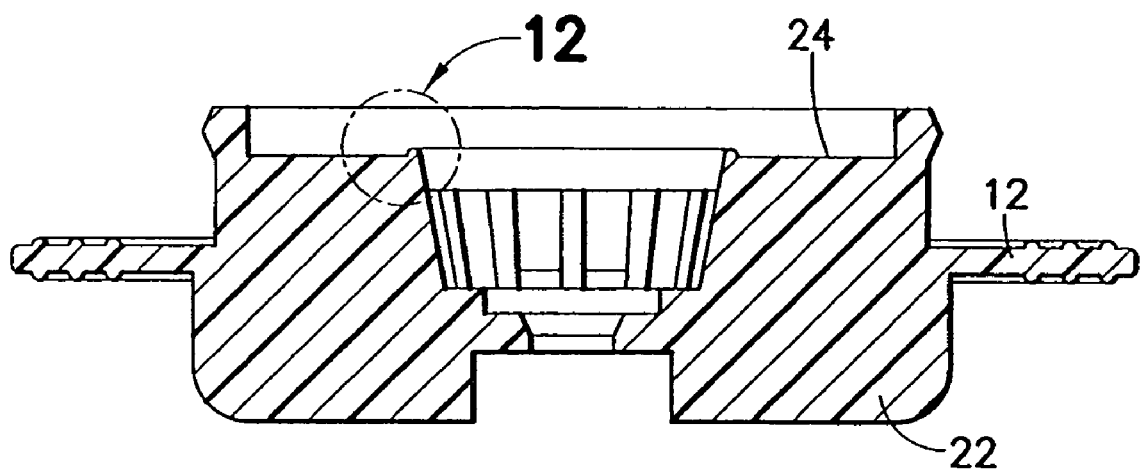
FIG. 11 is a drawing showing a cross-sectional view of the valve assembly base of FIG. 10, the section being taken along line 11-11 seen in FIG. 9.
Figure 12:
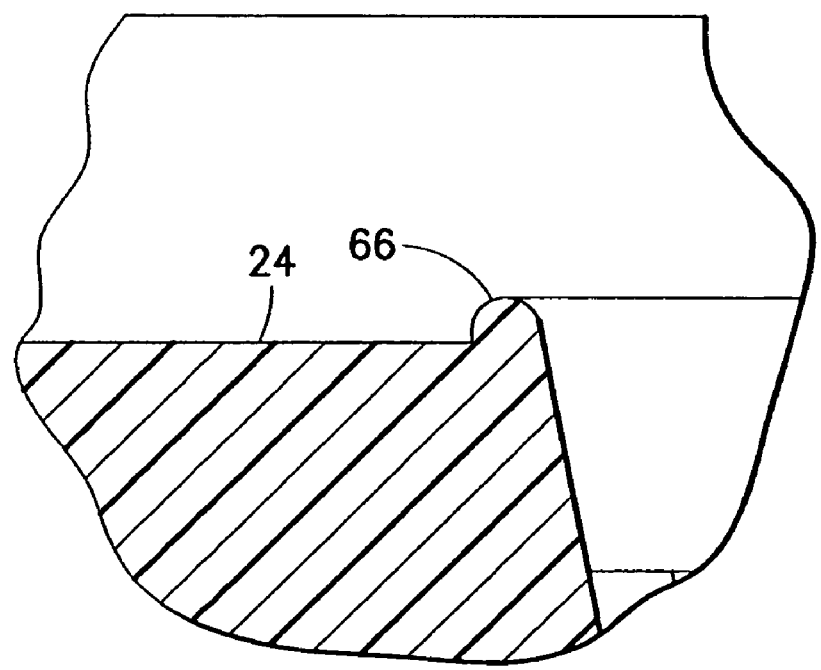
FIG. 12 is a drawing showing, on a magnified scale, the portion of the base inside the dash-dot circle in FIG. 11.

In accordance with the disclosed embodiment of the present invention, the retaining ring is eliminated from the valve assembly and means are provided on the flange 12 of base 10 for improving the speed of the conduction heat sealing operation by which the valve assembly is attached to the bag. Two views of the base 10 are presented in FIGS. 9 and 10. A sectional view is presented in FIG. 11. As shown in FIG. 10, the foregoing means comprise a series of concentric circular beads formed on the surface of the flange 12 to which the bag making film is joined. In the example shown in FIGS. 9 and 10, three circular beads 74, 76 and 78 are provided, with the difference in radius of the outer and middle beads 76 and 78 being equal to the difference in radius of the inner and middle beads 74 and 76. Each of the beads 74, 76 and 78 has a respective profile that is generally constant along its circumference, which profiles may be substantially the same for the three beads.

During the sealing operation (sealing the base of the valve assembly to the bag making film), a portion of the bag making film on the periphery of the hole through which the valve base 10 passes is pressed between a heated annular sealing ring (not shown) and the flange 12 of base 10. The annular sealing ring hasan outer diameter greater than the diameter of the outer bead 78 and an inner diameter less than the diameter of the inner bead 74. Allowing for certain tolerances in the placement of the heated annular sealing ring, portions of one or more of the beads 74, 76, 78 are melted along the entire circumference of the sealing ring during the heat sealing operation, thereby providing an annular hermetic seal around the hole in the bag. The beads 74, 76, 78 act as heat concentrators during the sealing operation. The beads melt rapidly and then fuse to the bag making film to form the hermetic seal during cooling. The presence of these heat-concentrating beads speeds up the conduction heat sealing process, thereby reducing the cost of manufacture.

Optionally, an identical set of concentric circular beads 80, 82, 84 can be formed on the other side of the flange 12. Beads 80, 82, 84 are used to ensure a hermetic seal during vacuum testing of the valve assembly. Each of the beads 80, 82 and 84 has a respective profile that is generally constant along its circumference, which profiles may be substantially the same for the three beads.

While the disclosed embodiment has three mutually concentric circular heat-concentrating beads, it should be appreciated that the broad scope of the invention encompasses the formation of any number of heat-concentrating beads on the flange of the valve base. For example, a single circular heat-concentrating bead could be used.

The evacuable storage bag may be constructed from two panels of film joined together (e.g., by conduction heat sealing) along three sides of a rectangle. To maintain a vacuum inside the storage bag, the zipper in a closed state must provide a hermetic seal at the mouth (i.e., fourth side) of the bag. Many different types of zippers can be used. The present invention is not directed to any particular zipper construction. For the sake of illustration, however, a suitable zipper for use with the present invention will now be described with reference to FIG. 13.

Figure 13:
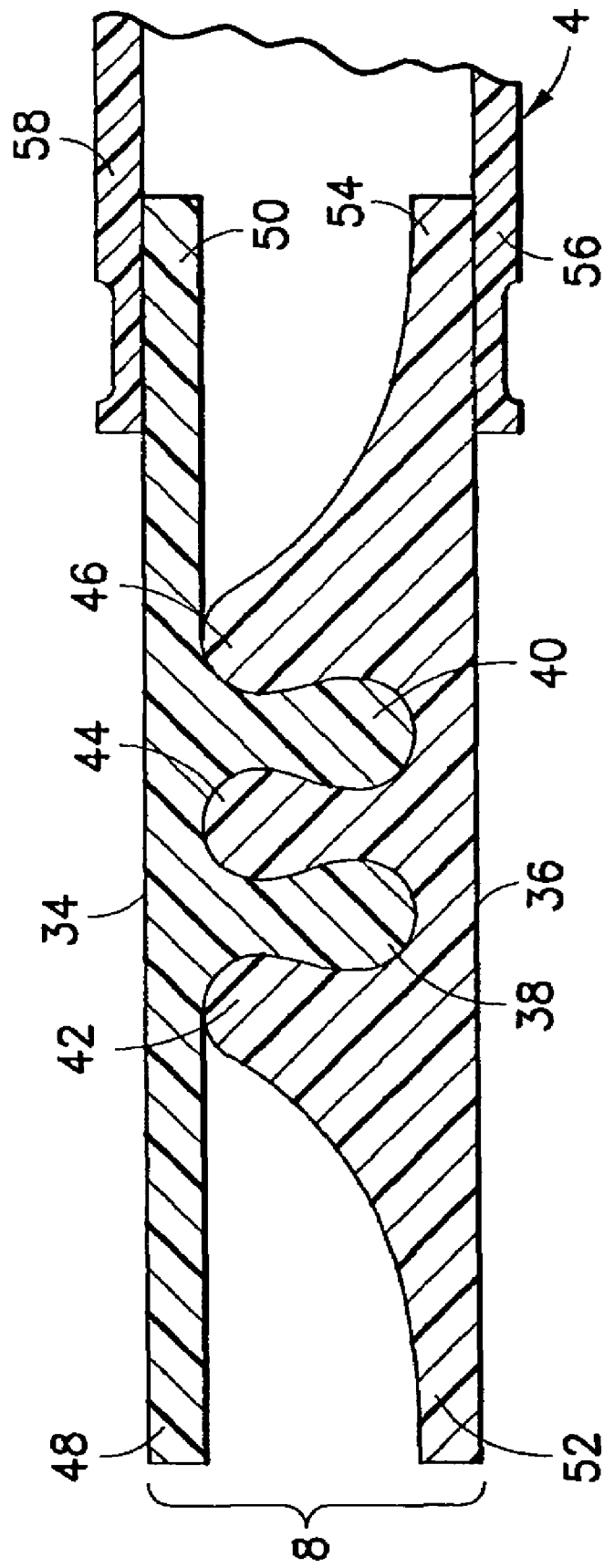
FIG. 13 is a drawing showing a cross-sectional view of a known zipper suitable for use with a bag of the type depicted in FIG. 1.

FIG. 13 shows a conventional zipper 8 that comprises a pair of mutually interlockable zipper strips 34 and 36. The zipper strip 34 comprises a pair of projections 38 and 40 having ball-shaped closure profiles, a pull flange 48, and an extension flange 50 that is joined to one wall 58 of the bag. The zipper strip 36 comprises a trio of projections 42, 44 and 46 having ball-shaped closure profiles, a pull flange 52, and an extension flange 54 that is joined to the other wall 56 of the bag. The bag walls are typically joined to the zipper extension flanges by means of conduction heat sealing. The projections 38 and 40 interlock with projections 42, 44 and 46 by fitting inside the respective spaces therebetween, as shown in FIG. 13. The pull flanges 48 and 52 can be gripped by the user and pulled apart to open the closed zipper. The opened zipper can be reclosed by pressing the zipper strips together along the entire length of the zipper with sufficient force to cause the projections 38 and 40 to enter the respective spaces between the projections 42, 44 and 46. Alternatively, a slider (not shown) can be used to close the zipper. Typically, such a slider takes the form of a U-shaped clip that fits over the zipper with clearance for the pull flanges, while the legs of the clip cam the zipper profiles of the incoming zipper section into engagement when the slider is moved along the zipper in either direction. The opposing ends of the zipper strips 34 and 36 are typically fused together in the regions of the bag side seals.

The person skilled in the art of manufacturing reclosable bags on a machine would readily appreciate that instead of forming the bag from two separate webs of plastic film joined together on three sides, the bag can be formed from a single web of film that has been folded. In the completed bag, this fold will form the bottom of the bag, while the two side seals are formed by conduction heat sealing.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the verb "joined" means fused, bonded, sealed, tacked, adhered, etc., whether by application of heat and/or pressure, application of ultrasonic energy, application of a layer of adhesive material or bonding agent, interposition of an adhesive or bonding strip, etc.

The invention claimed is:

1. A valve assembly comprising:
 a valve base comprising a generally annular seat disposed along a periphery of a hole and a flange disposed radially outward of said generally annular seat; and
 a valve element coupled to said valve base for opening said hole in a first state and closing said hole in a second state, said valve element comprising a diaphragm that is deformable and configured to contact said generally annular seat to close said hole in a first diaphragm state and to separate at least partially from said generally annular seat to allow fluid flow through said hole in a second diaphragm state, said diaphragm transitioning from said first diaphragm state to said second diaphragm state by deformation,
 wherein said flange of said valve base comprises a first generally annular planar surface, and a first bead projecting from said first generally annular planar surface and not in contact with said diaphragm.

2. The valve assembly as recited in claim 1, wherein said first bead is generally constant in height around its circumference.

3. The valve assembly as recited in claim 1, wherein said valve base further comprises a second bead projecting from said first generally annular planar surface and not in contact with said diaphragm, said second bead being concentric with said first bead.

4. The valve assembly as recited in claim 3, wherein said flange of said valve base further comprises a second generally annular planar surface, said first and second generally annular planar surfaces being on opposite sides of said flange, and mutually concentric third and fourth beads projecting from said second generally annular planar surface.

5. The valve assembly as recited in claim 1, wherein said generally annular seat comprises a second bead, said diaphragm in said first diaphragm state being in contact with said second bead.

6. The valve assembly as recited in claim 1, wherein said valve base further comprises a generally circular outer wall projecting generally perpendicularly upward from an outer periphery of said generally annular seat, further comprising a cap onto said generally circular outer wall, wherein said cap comprises a downwardly depending generally circular first circular inner wall having a rim that urges a generally annular portion of said diaphragm against said generally annular seat when said cap is in a predetermined position relative to said generally circular outer wall of said valve base.

7. The valve assembly as recited in claim 6, wherein said cap further comprises a downwardly depending center post that bears against a central portion of said diaphragm when said cap is in said predetermined position relative to said generally circular outer wall of said valve base, said first circular inner wall being generally concentric with said center post.

8. The valve assembly as recited in claim 6, wherein said valve element further comprises a generally annular outer portion connected to said diaphragm by diametrally opposed neck portions, and said cap further comprises a downwardly depending second circular inner wall that contacts said generally annular outer portion of said valve element when said cap is in said predetermined position relative to said generally circular outer wall of said valve base, said second circular inner wall being generally concentric with said first circular inner wall.

9. A valve assembly comprising:
 a valve base comprising a generally annular seat having a bead disposed around a periphery of a hole, a generally circular outer wall projecting generally perpendicularly upward from an outer periphery of said generally annular seat, and a flange disposed radially outward of said generally circular outer wall;
 a valve element coupled to said valve base for opening said hole in a first state and closing said hole in a second state, said valve element comprising a diaphragm that is deformable and configured to contact said bead to close said hole in a first diaphragm state and to separate at least partially from said bead to allow fluid flow through said hole in a second diaphragm state, said diaphragm transitioning from said first diaphragm state to said second diaphragm state by deformation, and
 a cap comprising a downwardly depending generally circular first circular inner wall having a rim that urges a generally annular portion of said diaphragm against said bead when said cap is in a predetermined position relative to said generally circular outer wall of said valve base, and a downwardly depending center post that bears against a central portion of said diaphragm when said cap is in said predetermined position relative to said generally circular outer wall of said valve base, said first circular inner wall being generally concentric with said center post.

10. The valve assembly as recited in claim 9, wherein a gap separates said diaphragm from a portion of said cap that connects said first circular inner wall to said center post.

11. The valve assembly as recited in claim 9, wherein said valve element further comprises a generally annular outer portion connected to said diaphragm by diametrally opposed neck portions, and said cap further comprises a downwardly depending second circular inner wall that contacts said generally annular outer portion of said valve element when said cap is in said predetermined position relative to said generally circular outer wall of said valve base, said second circular inner wall being generally concentric with said first circular inner wall.

12. The valve assembly as recited in claim 9, wherein said bead is generally circular.

13. A bag comprising:
 a receptacle having a mouth at an upper end and comprising a wall having an aperture;
 a plastic zipper joined to said mouth, wherein said zipper comprises first and second zipper strips that extend across said mouth, said first zipper strip comprising a first closure profile and said second zipper strip comprising a second closure profile, said first and second closure profiles being mutually interlockable to form a hermetic seal, said mouth being closed when said first and second closure profiles are interlocked and being open when said first and second closure profiles are disengaged; and
 a one-way valve assembly installed in said aperture in said wall of said receptacle and comprising:
 a valve base comprising a generally annular seat having a bead disposed around a periphery of a hole, a generally circular outer wall projecting generally perpendicularly upward from an outer periphery of said generally annular seat, and a flange disposed radially outward of said generally circular outer wall, said flange being attached to a peripheral portion of said wall surrounding said aperture;

a valve element coupled to said valve base for opening said hole in a first state and closing said hole in a second state, said valve element comprising a diaphragm that is deformable and configured to contact said bead to close said hole in a first diaphragm state and to separate at least partially from said bead to allow fluid flow through said hole in a second diaphragm state, said diaphragm transitioning from said first diaphragm state to said second diaphragm state by deformation, and a cap comprising a downwardly depending generally circular first circular inner wall having a rim that urges a generally annular portion of said diaphragm against said bead when said cap is in a predetermined position relative to said generally circular outer wall of said valve base, and a downwardly depending center post that bears against a central portion of said diaphragm when said cap is in said predetermined position relative to said generally circular outer wall of said valve base, said first circular inner wall being generally concentric with said center post.

14. A bag comprising:

a receptacle having a mouth at an upper end and comprising a wall having an aperture;

a hermetic seal joined to said mouth;

a one-way valve assembly installed in said aperture in said wall of said receptacle and comprising:

a valve base comprising a generally annular seat having a bead disposed around a periphery of a hole;

a valve element coupled to said valve base for opening said hole in a first state and closing said hole in a second state, said valve element comprising a diaphragm that is deformable and configured to contact said bead to close said hole in a first diaphragm state and to separate at least partially from said bead to allow fluid flow through said hole in a second diaphragm state, said diaphragm transitioning from said first diaphragm state to said second diaphragm state by deformation, and a cap coupled to said valve base and comprising a downwardly depending generally circular inner wall having a rim that urges a generally annular portion of said diaphragm against said bead, and a downwardly depending center post that bears against a central portion of said diaphragm, said circular inner wall being generally concentric with said center post.

15. The bag as recited in claim 14, wherein said hermetic seal comprises a plastic zipper joined to said mouth, wherein said zipper comprises first and second zipper strips that extend across said mouth, said first zipper strip comprising a first closure profile and said second zipper strip comprising a second closure profile, said first and second closure profiles being mutually interlockable to hermetically seal an interior volume of said receptacle, said mouth being closed when said first and second closure profiles are interlocked and being open when said first and second closure profiles are disengaged.

16. The bag as recited in claim 14, wherein said valve base further comprises a generally circular outer wall projecting generally perpendicularly upward from an outer periphery of said generally annular seat, and said cap further comprises a generally circular outer wall force fit onto a rim of said generally circular outer wall of said valve base.

* * * * *